United States Patent [19]

Poliniére

[11] 3,968,573

[45] July 13, 1976

[54] METHOD AND MEANS FOR INFORMATION PRESENTATION

[75] Inventor: Jean-Paul Poliniére, Biarritz, France

[73] Assignee: Allen Grossman, New York, N.Y. ; a part interest

[22] Filed: Oct. 24, 1974

[21] Appl. No.: 517,748

[52] U.S. Cl. .................................. 35/7 R; 283/1 A
[51] Int. Cl.² ........................................ G09B 29/00
[58] Field of Search ............ 35/7; 40/2 R; 283/1 A, 283/34

[56] References Cited
UNITED STATES PATENTS 1,406,173   2/1922   Detrick ............................... 283/1 A

*Primary Examiner*—Louis G. Mancene
*Assistant Examiner*—John H. Wolff
*Attorney, Agent, or Firm*—Kenyon & Kenyon Reilly Carr & Chapin

[57] ABSTRACT

A new information display system for the student, the technician and the general public which arranges consolidated information in a visual presentation form for rapid and comprehensive understanding. The system interrelates dependent or independent data or operational information, in a fashion that facilitates action or learning, through five basic operations: (1) defining the limits of bodies of information that concern given classes of objects or actions by identifying the fixed and variable factors related to the users' needs; (2) dividing each body of information into open movable vertical display panels that present the minimum amount of information needed for selection or action; (3) dividing each panel into a plurality of charts that summarize standardized data, recommendations and facts; (4) adding to the side of any such panel a marginal scale that characterizes a common factor such as space or time; (5) rearranging ad-hoc panels side by side to answer the users' needs for more complex comparisons.

3 Claims, 5 Drawing Figures

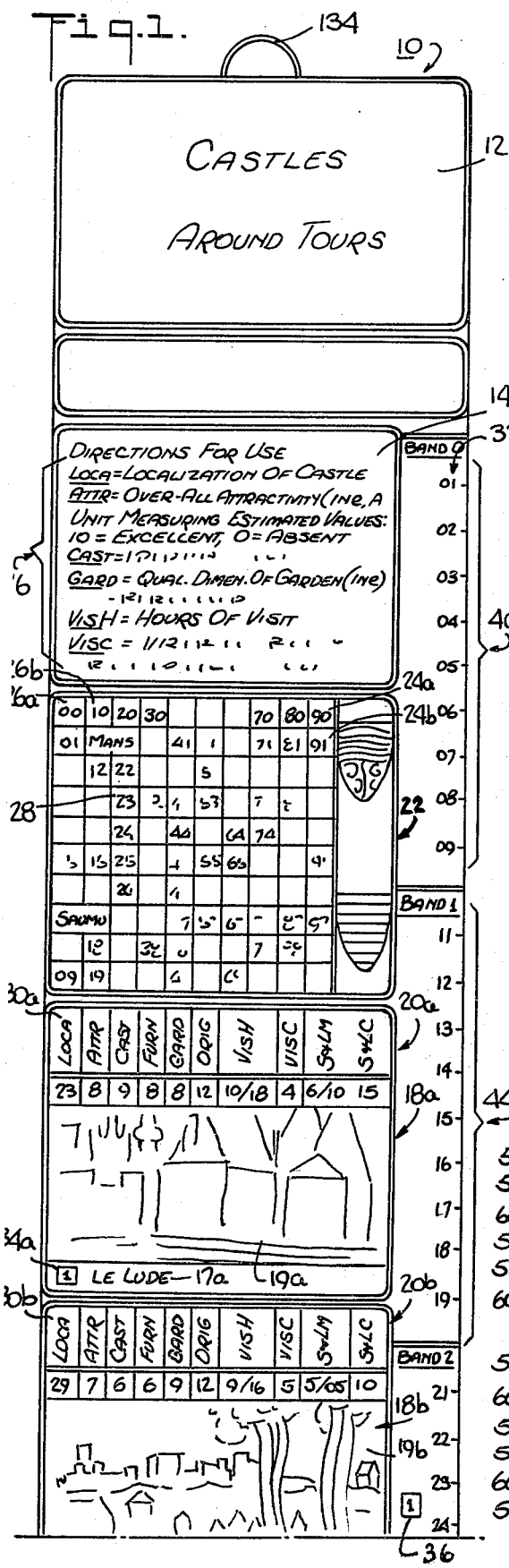
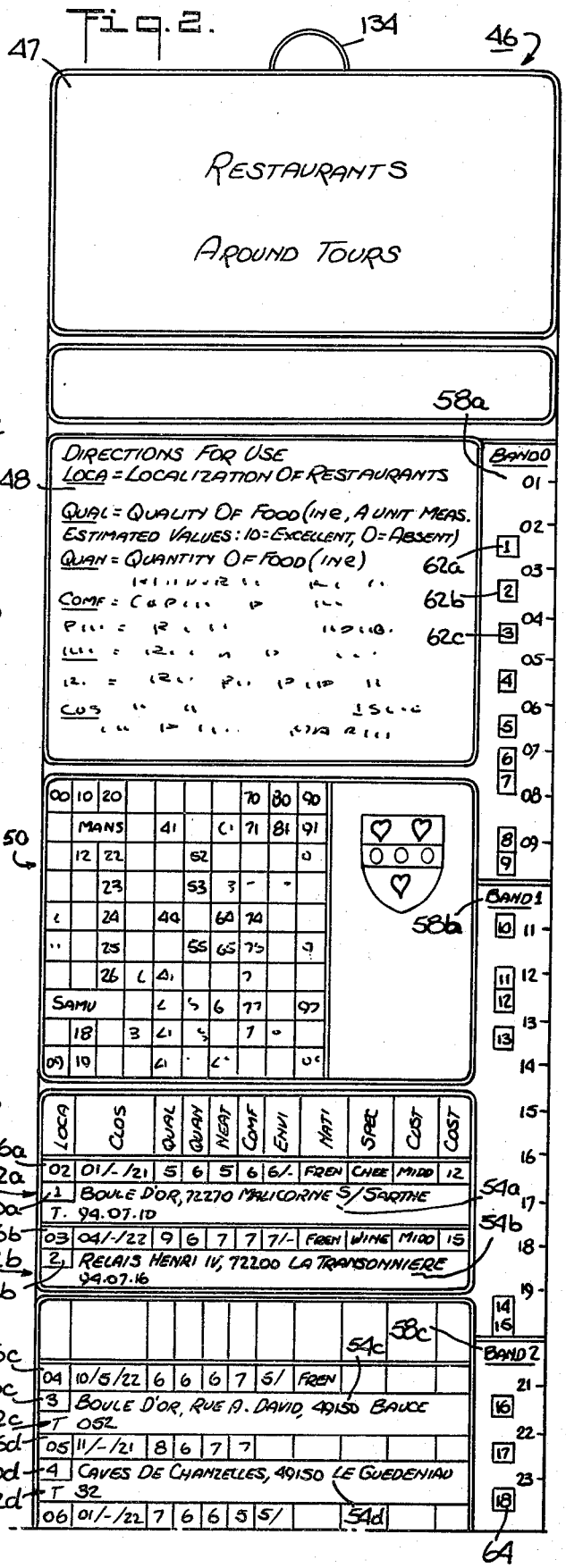

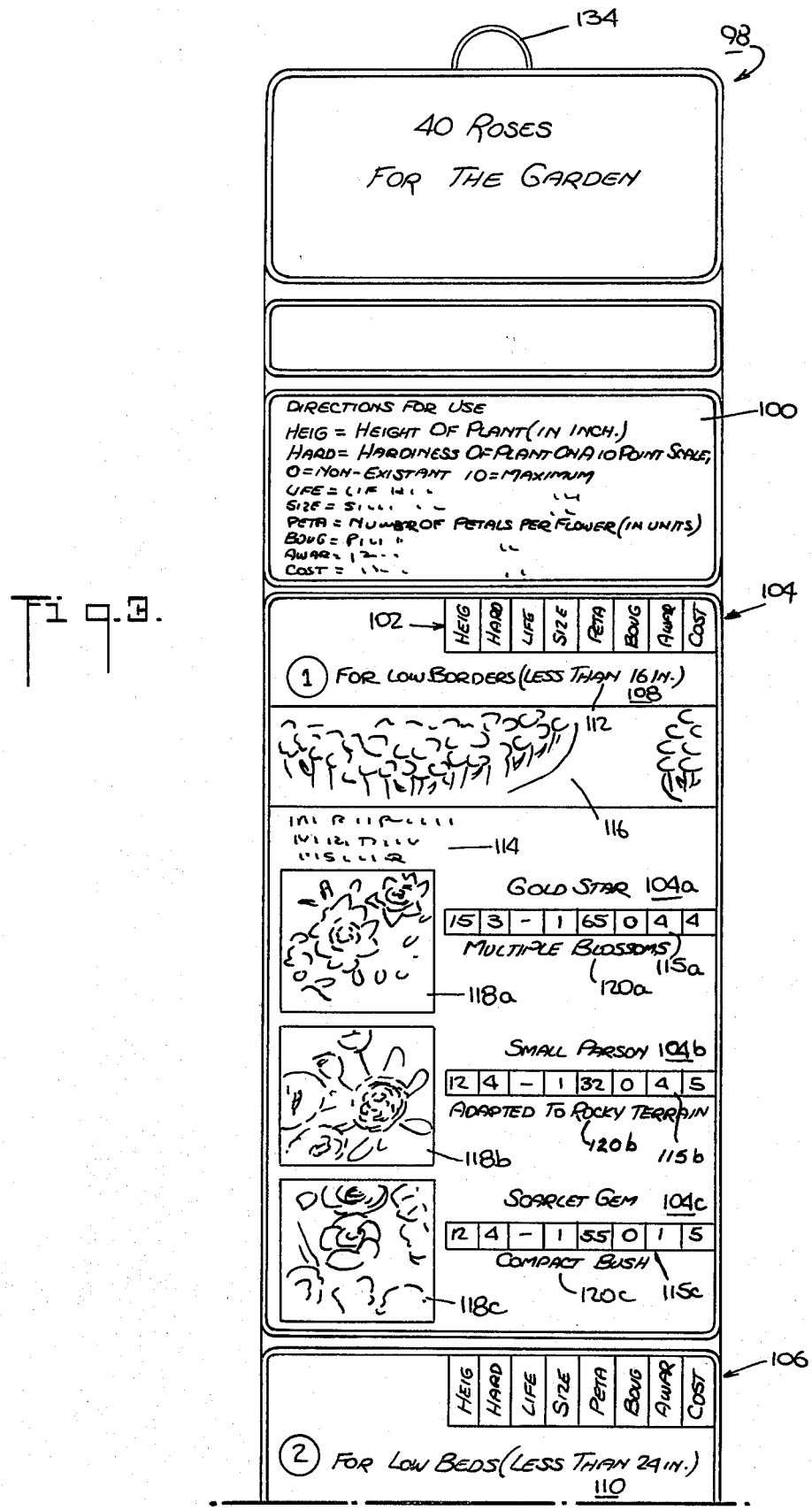

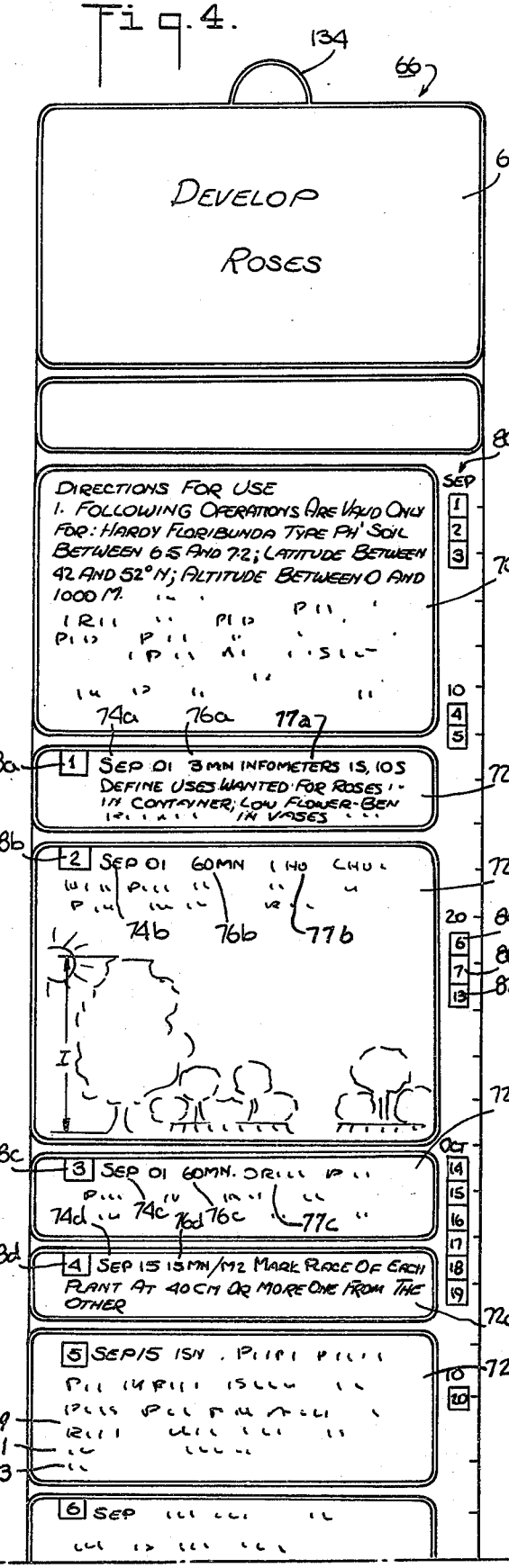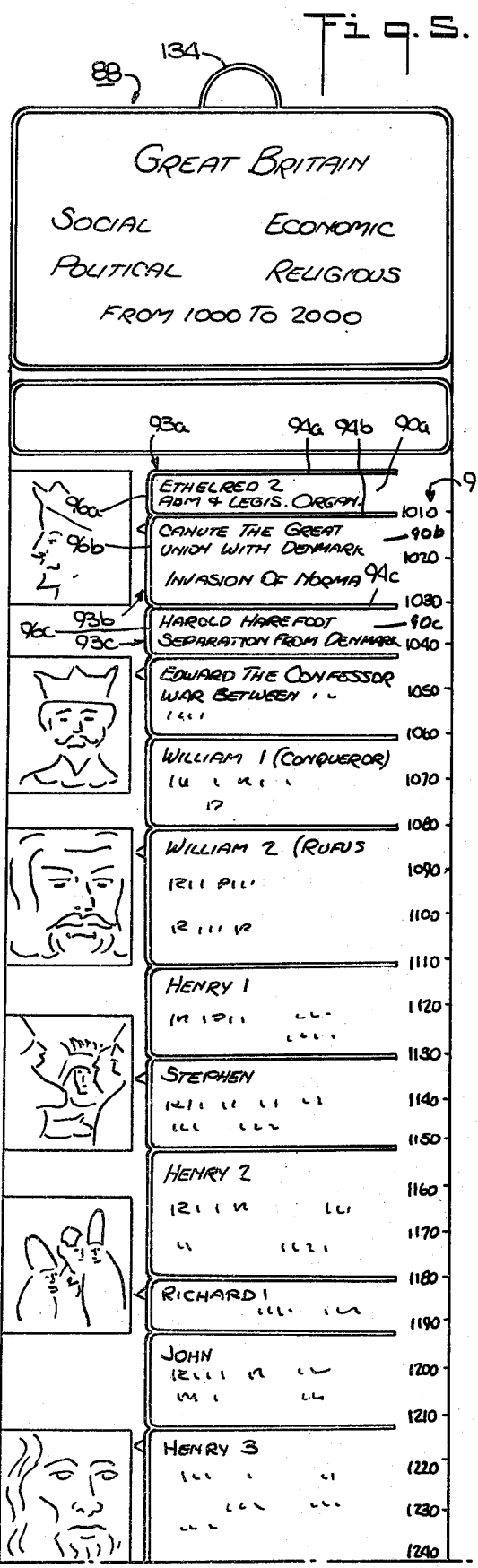

METHOD AND MEANS FOR INFORMATION PRESENTATION

BACKGROUND OF THE INVENTION

1. Field of the Invention

This invention relates to a new information display system for visually and systematically interrelating dependent and independent data or operational information.

2. Description of the Prior Art

The book or the pamphlet is today one of the most common means for providing the information needed by the general public to attain given objectives or to learn about a complex series of events. There are however characteristics inherent to the book that do not allow the satisfactory presentation of all types of information.

The information within a book is presented in a divided and closed format, and because the amount of information a book contains is so unlimited, books, even dealing with the same subject matter, can be and are usually presented independently of what may appear in another book. This means that the user cannot obtain an overview of how books dealing with a given subject matter interrelate, and this compels him to the painstaking task of analyzing their content before he can make a decision to buy one or more of the books.

The versatility of a book allows the information to be presented in any sequence or grouping, which may result in difficulties for the user to locate the parts relevant to his needs. The user often finds himself at a loss for rapid application of the information needed, or with several of his fingers inserted at appropriate pages of the book as he attempts to follow the steps and improve his understanding of how the written word relates to corresponding illustrations or other written word.

The characteristics of the book discussed in the preceding paragraphs are of additional concern when the user wants to compare information within several books in related subject matters to make a coordinated decision. That information will be set forth in various places in the respective books, and the user finds himself referring back and forth from various parts of one book to other parts of the related books.

SUMMARY OF THE INVENTION

This invention provides a new information display system which allows for quick access and ready comprehension of the information presented.

Each body of factual or recommended information with which the invention is concerned, involves objects or actions at given levels or classes of organization. The limits of the bodies of information to be presented are first defined by identifying the fixed and variable factors related to the users' needs. These factors would include "type," "objective" and "context."

Each body of information is divided into open, movable and portable vertical display panels presenting the minimum amount of information needed at the considered level or class for selection or for an action of a higher order. The information displayed is structured so that within each panel there is contained the jumping off point for the next level of panels. At a given level or class, any panel may be used independently or in comparison with other panels. The former use will allow the user to buy no more than the exact amount of information needed. The latter use will simplify complex searches such as looking for various sorts of tourist and gastronomic centers of interest in a given geographical area or comparing the evolution of historical events in distant countries.

Each panel comprises a plurality of charts summarizing data including images which is standardized in format within and between panels. These charts are arranged in a sequential fashion based upon the same common characteristic or factor belonging to the "type," "objective" or "context," as to allow the rapid location and easy implementation of the needed information; for example, sequences are presented in the successive level of inquiry for objects, or the chronological order for elementary independent actions.

An adaptation of the invention calls for inclusion of a marginal scale along the vertical length of the panel. The scale is a spatial representation of a common factor such as space or time and provides an intermediary for comparison between and among panels as well as providing a means for horizontally aligning such charts, further facilitating the comparison process.

In certain cases, a plurality of charts on a given panel can be separated and collected into a plurality of groups which can be differentiated, one from the other, by a factor or characteristic peculiar to a given group. The differentiation can likewise be based on a specified relationship, e.g., cause-effect, etc.

The panels are equipped with means for hanging them so that their respective subject matter may be easily overviewed for group discussion and constant learning.

Individual panels can be provided with horizontal fold lines for compact folding. Panels concerning various aspects within a body of information can be placed on a suitable carrier which is folded in accordion-like fashion to allow selective viewing and comparison within that body.

Color coding can be employed to portions of the panels to facilitate the use and comparisons of panels and to enhance their overall attractiveness and attention-getting aspects.

Through the various means discussed in preceding paragraphs, two or more panels belonging to the same body of information can be systematically compared.

It is an object of the invention to provide a method and means for organizing information from the overall information body to its parts, which thereby avoids overlapping and gaps in later development of the elementary pieces of information.

It is another object of this invention to provide a method and means for presenting information in an attention-getting and decorative way through the use of manipulatable vertical panels that are rapidly understood and easily interrelated to other panels in the framework of an information display system.

BRIEF DESCRIPTION OF THE DRAWINGS

Reference is now made to the accompanying drawings for a better understanding of the nature and objects of the invention. The drawings illustrate the best mode presently contemplated for carrying out the objects of the invention and its principles, and they are not to be construed as restrictions or limitations on its scope. In the drawings:

FIG. 1 shows an embodiment of the invention as applied to one example of information on objects of a given type in a narrow context.

FIG. 2 shows an embodiment of the invention as applied to a second example of information on objects of a given type in a narrow context.

FIG. 1 and FIG. 2 combined together show an embodiment of the invention as applied to one example of information in a body of information.

FIG. 3 shows an embodiment of the invention as applied to an example of information on objects of a given type in a wide context.

FIG. 4 shows an embodiment of the invention as applied to an example of information on recommended actions in a wide context.

FIG. 5 shows an embodiment of the invention as applied to an example of information on past actions in a narrow context.

DESCRIPTION OF THE PREFERRED EMBODIMENTS

This invention provides a new information display system which allows for quick access and ready comprehension of any body of information presented.

Each body of factual or recommended information with which the invention is concerned, involves objects or actions at given levels or classes of organization. In speaking of "levels of organization" herein, it is intended to reflect information arrangements where a given object or action, such as growing roses, is considered at a certain level of organization, its constituents such as the individual fertilizing or pruning "actions" are considered at the next lower level of organization. In speaking of "classes of organization" herein, it is intended to represent an information arrangement where a given action or object such as tourist attractions is considered in a certain class of organization, its various representations such as castles or restaurants are considered in the next lower class of organization.

The limits of the bodies of information to be presented are first defined by identifying the fixed and variable factors related to the user's needs. These factors would include "type" "objective" and "context." As applied to a particular body of information, e.g., "tourist attractions," as illustrated below, the variable factor "type" would be used to catalog various objects of a given "type" such as "types of castles or restaurants," for example. These could further be classified within the additional factor, "context," say, for example, the context of space, Tours, France, or time, 15the or 16th century, etc. The factor "objective" within this body of information might define a segment thereof directed to attractions adapted for tourist photography.

This system's approach, from the overall information body to its parts, based on these factors, avoids overlapping and gaps in later development of the elementary pieces of information, called in the following paragraphs, vertical display panels.

Each body of information, as illustrated in the combination of FIGS. 1 and 2, is divided into open, movable vertical display panels presenting the minimum amount of information needed at the considered level or class for selection or for an action of a higher order. In the preceding example, for a "type" identification of castles, within the "context" of space, Tours, France, the minimum amount of information would be the castles in the area of Tours, France.

The information displayed is structured so that within each panel there is contained the jumping off point for the next level of panels. E.g., one panel might catalog canines as to their useful qualities such as hunting, watching, guiding, etc.; the next level of panels would expand on respective ones of these qualities, for example setting forth the various applicable breeds of dogs within one function and how each breed compares in terms of the characteristics required by the user.

The understanding of this is obviously facilitated if one aligns the lower order of panels in a row below the higher order ones so that the user can scan from the higher level of information down to the lower.

Hereafter panels concerning representative subjects are discussed individually to promote an understanding of the invention. The subjects used for illustration in no way limit the scope of the invention, which may be used with any given subject matter concerning objects or actions.

FIG. 1 is an illustration of one embodiment of the invention that portrays a vertical panel in the body of information, tourist attractions, in the area of Tours, France. The "type" of objects covered thereby is castle. A vertical display panel 10 shows this collection of information and its presentation. The information presented may be used by one desirous of making a selection from within a group. The invention facilitates this process.

The panel includes a title portion 12 from which the user can readily determine the subject content of a particular panel. Positioned below the title portion of the panel 10 is an introductory chart 14. This introductory chart identifies particular characteristics or factors attributable to all objects within the group covered by the panel and identifies these characteristics or factors by suitable abbreviated notations, 16. The user is immediately aware of what aspects of the object will be reviewed.

Further down on the vertical display panel 10 is located a plurality of main charts 18a, 18b, etc., wherein each object is identified and therein described in summary form, particularly characteristics or factors of the objects to be compared.

Each of the main charts, 18a, 18b, etc., represent a description of the characteristics or factors concerning one object. The name of the particular attraction plus a picture if desired is included at 17a and 19a, 17b (not shown) and 19b, etc. Each of the charts includes a columnar tabulation 20 of the abbreviated notations, 16, which are defined in the introductory chart 14. These abbreviated notations are set out in a horizontal arrangement, as viewed in FIG. 1, across the top of each of the main charts. The particular position for each abbreviated notation at the top of each chart is standardized. The result is, that when the various ones of the main charts are arranged in a vertical relationship as shown, the particular column identified by the given abbreviated notation is vertically aligned with the same column of the other charts. Thus for example, the column identified in chart 18a as "ATTR" is vertically disposed above the similarly identified column on the main chart 18b, immediately below the main chart as well as all other main charts which comprise that particular display. This allows the user to rapidly compare the same characteristics or factors of any object presented.

Certain ones of the columns identified by abbreviated notations that pertain to characteristics or factors of the object are either subjective in nature such as "overall attractivity" identified by the abbreviated notion "ATTR" or not usually meaningfully expressed in quantitative form such as "state of the furniture" to be found in the castle, identified by the abbreviated notation "FURN." A weighting based on a relative numerical scale is assigned to these characteristics or factors to facilitate comparison between like characteristics or factors in a plurality of main charts 18a, 18b, etc. For example, the particular castle identified in chart 18a has under the abbreviated notation "ATTR" been assigned a relative numerical value of 8, whereas the same characteristic or factor for the castle identified by chart 18b has been assigned a relative numerical value of 7.

The relative system established is preferably standardized to a normalized scale common to all characteristics or factors of the objects that are weighted (See Table 1). This overcomes the inherent psychological problems users would encounter if a different weighing system were employed for each characteristic or factor as in Table 2.

| TABLE 1 | | | | TABLE 2 | | | |
|---|---|---|---|---|---|---|---|
| Normalized scale 10=excellent; 0=absent | | | | Non-normalized scales Attr: 10=excellent; 0=absent Quan: 5=more than you can eat 0=fine for children Qual: 5=gourmet's taste; 0=unexciting | | | |
| Attraction | Attr | Quan | Qual | Attraction | Attr | Quan | Qual |
| A | 8 | 8 | 4 | A | 8 | 4 | 2 |
| B | 4 | 4 | 4 | B | 4 | 2 | 2 |
| C | 8 | 6 | 8 | C | 8 | 3 | 4 |

From an analysis of above tables it becomes quite apparent how confusing it can become if two or three relative weighing schemes are employed. Therefore, the preferred embodiment employs a single normalized scale, further enforcing the usefulness and desirability of the invention.

In addition to those aspects with regard to each of the identified objects which are weighted, there are particular characteristics or factors which are normally measured in quantitative form. Such features for example, include the visiting hours of a particular attraction (identified by the abbreviated notation "VIS H"). Appropriate numbering systems can be employed to identify each of these characteristics or factors in an abbreviated form. For example, with regard to the visiting hours of a location, main chart 18a indicates that that particular attraction is open from 10:00 in the morning to "18:00" hours or 6:00 in the evening. This is designated by the numbers "10/18" shown immediately below the abbreviated notation "VIS H".

With various numbers introduced beneath each of the columnar tabulations, 20, the main charts are arranged in a vertical relationship on the display 10 such that one can easily compare the various common characteristics or factors enumerated by quickly scanning downward through the panel. Colors can be used to identify each column to further facilitate the scanning thereof.

Preferably, the columns are arranged left to right in accordance with the user's successive level of inquiry. Thus, for example, the first column might show the cost of a particular attraction, if this is determined to be the most important item for the majority of people, and the second column might, with regard to the embodiment of FIG. 2, indicate the quality of the food to be found at the particular restaurants, and so forth. This order will save time for most users by presenting the variables in a logical order that will allow rapid decision making.

FIG. 1, again, illustrates an embodiment wherein the particular items identified in the plurality of main charts, 18a, 18b, etc., are all located within a particular geographical area - Tours, France. In such situations, the display panel of applicant's invention can be expanded to include an internal geographical chart 22. This internal geographical chart, 22, can be prepared by taking a map of the involved geographical area and in the preferred embodiment sectioning that map into a plurality of rows 24a, 24b, etc., and columns 26a, 26b, etc. The map takes on a checkerboard-like appearance.

Each of the subsections in the checkerboard pattern are assigned a unique number. Each of these unique numbers, from "00" to "99" in FIG. 1, identify a square area on the particular geographical map illustrated.

For this particular adaptation of the basic invention the columnar tabulation, 20, for each of the main charts could be expanded to include 30a, 30b, etc., representing the location (abbreviated notation — Loca) on the map of this particular object as illustrated in the chart. In the illustration shown, a particular attraction depicted by main chart 18a would be located on the map within the area defined by the unique number 23. Other attractions on the display panel would have accompanying unique numbers corresponding to their approximate geographical location on the sectioned map.

This particular embodiment of the invention, wherein the information displayed includes a selected common factor — here, location within the same geographical area, is expanded to include along the vertical length of the panel 10 on one of the edges thereof, a marginal scale, 32. The marginal scale for the illustration of FIG. 1 is a sequential arrangement of the unique numbers which were assigned to the particular blocks within the checkerboard pattern of chart 22. Bands of such unique numbers, corresponding to each of the columns 26, are set up along the vertical length of the panel with the sequential arrangement of unique numbers within each band corresponding to the ascending order of numbers in each column in chart 22.

It is important to note that the row - column technique for sectioning the map can be replaced by other suitable arrangements with an appropriate numbering scheme which would then be laid out along the vertical length of the panel.

To effectively use the marginal scale set up along the length of the panel, particular main charts, 18a, 18b, etc., have assigned thereto corresponding unique characters 34a, 34b, (not shown) etc. The unique character for each of the attractions shown in the various main charts is entered opposite or between particular unique members in the marginal scale which corresponds to the approximate physical location of the attraction on the chart 22. Thus, the attraction depicted in FIG. 18a, identified as character 1 and entered at point 28 on the geographical map is seen to be located on the marginal scale between the areas represented by unique numbers 23 and 24.

Although not identifiable from the traditional black and white drawings required by the Patent Office, particular columns of the chart 22 and corresponding bands along the vertical length of the panel may be color coordinated to provide quick visual comparison. This further enhances the usefulness of the invention.

Thus, for example, column 26a might have a red background color with the corresponding band 40 similarly colored. Column 26b and band 44 might be colored green, and so forth.

FIG. 2 is also an illustration of one embodiment of the invention useful for selection from within a group. This panel relates to restaurants, also located in the area Tours, France. This information is from the same body of information and at the same level as FIG. 1. This vertical display panel 46, includes a title portion 46 and an introductory chart 48 wherein particular characteristics and factors common to the restaurants are identified for purposes of using the chart. A sectioned map, 50, is included and of course the various plurality of main charts 52a, b, c, etc. Each of these main charts contains selective information on a particular restaurant identified at 54a, b, c, etc., located within the geographical area shown on the map 50. Here, the identification of the restaurants, 54a, b, c, also include street addresses. Assigned unique numbers 56a, 56b, 56c, etc., entered in the "Loca" column for each chart, locate the corresponding restaurant within the approximate geographical area of the sectioned map 50.

In the preferred embodiment, the columns of chart or map 50 and corresponding bands 58a, 58b, 58c, etc., would be colored in an alternating fashion, in a manner similar to that described with regard to FIG. 1. Again, unique characters assigned to each of the identified restaurants for example 60a, 60b, 60c, etc., would be positioned at the appropriate location along the marginal scale, as indicated at 62a, 62b, and 62c, etc.

FIGS. 1 and 2 are placed on the drawing paper in the depicted relationship so as to exhibit another important aspect of this invention.

For those vertical display panels, for example 10 and 46, which display information relative to two distinct groupings of objects, tourists' attractions and restaurants respectively, located within the same geographical area, each including a unique numbering system wherein the same unique numbers are assigned to corresponding blocks or respective maps 22 and 50, the arrangement of information on the panels is such that when they are placed side by side as illustrated, the unique numbers on one panel horizontally align themselves with the same numbers on other panels. Thus a user of two such panels when holding them together in a vertical position such that the unique numbers align themselves, is able to tell, at a glance, what restaurants and tourist attractions are located within the same area. Thus as shown, one interested in the castle identified by the unique character 1 at point 36 could scan across to the right and find that a restaurant identified by unique character 18 at point 64 is located within the approximate geographical area. If one were interested in visiting that particular castle, through the use of this cross comparison he could readily identify the proximity of restaurants to that locale and facilitate his planning of the day's events. This graphic representation is significantly easier to use than locating respective attractions on a map, particularly if the area is unfamiliar to the user. Since the invention is portable, it enables the user to satisfy information needs as they may arise rather than attempting to anticipate them.

FIG. 3 is also an illustration of one embodiment of the invention also useful for selection from within a group. This embodiment refers to a broad category of information that does not relate to a marginal scale. Here in particular the charts illustrate the subject of selecting a rose for the garden. This panel 98 includes an introductory chart 100 which, similar to chart 14 in FIG. 1 explains the abbreviated notations located in column heading 102. For example, the height of the plant, "Heig," the hardiness, "Hard," cost, "Cost," etc.

Positioned below the introductory chart 100 are a plurality of groups, 104, 106, etc. of main charts 104a, 104b, 104c, and 106a, 106b, 106c, (not shown), etc. Positioned above the main charts within each group is a brief description 108, 110, etc., wherein those characteristics and factors of a given group, are described. It is these characteristics which distinguish one grouping from the others. For example, group 104 pertains in general to roses for low borders, i.e., less than 16 inches. The description 108 may include a photograph 116 of a typical rose arrangement for the group. This is a visual aid technique which facilitates one's evaluation. Other characteristic information of flowers in the group can be spelled out at 114.

Each of the main charts in a corresponding group include a horizontal arrangement of boxes 115a, 115b, 115c, etc. This arrangement of boxes are aligned with the columnar heading 102. Numbers are inserted in the boxes where applicable. These numbers either represent the relative merits of the characteristic or factor identified by the abbreviated notations or other appropriate numbers or words like those described in connection with FIG. 1, all of which enable the user to form a ready comparison between members within the same group. A photograph of the respective members of a group 118a, 118b, and 118c, can be employed for visual aid purposes as well as a brief description 120a, 120b, and 120c, of the peculiar characteristics of the particular member in the group.

The advantages of the embodiment of FIG. 3 are similar to those of the aforementioned embodiments including the ability to quickly scan vertically downward through a given group to identify on a relative basis which members of the particular group may satisfy a particular user's purposes. As with the other embodiments, sufficient information is presented for each member of the given group so as to enable the user to make a rapid and well informed decision as to the preferred type.

In the embodiment shown, the groups 104, 106, etc., can be differentiated, one from the other, by various characteristics. In other embodiments of a similar nature, the differentiation could be based on a specified relationship, e.g., cause and resulting effect, or similar criteria.

FIG. 4 is an illustration of one embodiment of the invention dealing with actions or operations on an object. This type of information is most commonly referred to as "how to" information. In particular, FIG. 4 relates to the step by step procedures involved in planting and cultivating roses.

FIG. 4 shows a display panel 66 including a title portion 68 — here entitled "Develop Roses." Positioned below the title portion is a "Directions For use" chart 70. In the particular case shown, this display panel would contain such basic information as acceptable soil conditions, latitude and altitude assumptions, tolerance on the particular dates enumerated in the procedural charts, therebelow, as well as the meaning of any color schemes used in the various charts describing the procedural steps.

Arranged below chart 70 are a series of independent elementary operations 72a, b, c, etc. The independent elementary operations are identified as unique entities in that they may be performed independent of any neighboring operation on the display panel. For example, independent elementary operation 72a concerns itself with the initial decision on the part of the user of display panel 66 as to what rose to choose. The independent elementary operations are presented in chronological order.

The information within each independent elementary operation is presented in standardized order that reflects the successive level of need of the user beginning with the suggested date the operation should be performed 74a, 74b, 74c, etc. This is followed by average needed time to accomplish the entire independent elementary operation 76a, 76b, 76c, etc. This is followed by the equipment and products needed 77a, b, c, etc. The dependent components or specific steps necessary for the user to complete the independent elementary operation are then listed in chronological order 79, 81, 83 in independent elementary operation 72e. Color coding as explained in the instruction chart 70, could be used to particularly identify elements common to each step, e.g., the calendar day identified on each chart may be red; material quantities to be used or time to complete each step might be green, etc. This enables quick visual sighting.

Each of the independent elementary operations would also be assigned a unique character 78a, b, c, d, etc., for purposes of identifying each step in the procedure and for use with the marginal scale now to be described.

The panel 66 includes along the vertical length thereof a marginal scale, 80, which for the particular type of information described would time - in time-in this case the calendar days of those months during which the planting and caretaking operations of the rose take place. The marginal scale would be scaled along the vertical length of the particular panel such that the entire period, necessary to complete all the independent elementary operations as described, would fit. The unique characters 78a, b, c, d, etc., are then placed at those locations along the marginal scale which correspond to the calendar days on which that particular operation takes place. Thus the operations defined by characters 78a, b, and c, are seen to occur in the early part of September, or approximately September 1st or 2nd.

This enables the user to determine at a glance the work load of any period. It further spatially and graphically represents and lends understanding to the relationship of one independent elementary operation to another in a fashion not obtainable by words alone. This spatial representation of time is another important aspect of the invention.

The marginal scale 80 laid out along the vertical length of the panel 66 provides the same advantage given by the information display panels described in FIGS. 1 and 2. The user can compare at least two panels dealing with similar subject matter by aligning them horizontally. From this comparison he can determine how operations of one panel are associated with each of the corresponding panels, and which occur on the same calendar day. This enables him to quickly plan his gardening activities for a given day. This comparative quality is beneficial for students in relating one set of procedures, such as experiments, to another.

FIG. 5 is an illustration of one embodiment of the invention dealing with actions in a given context, such as space or time. The specific illustration deals with time and relates to history. The display panel 88 includes a plurality of groupings of actions 90a, 90b, 90c, etc. These actions are summaries of particular events which occurred during an era — in this particular case, the events in Great Britain from 1,000 A.D. to the present. The groupings of actions may be determined by identifying any specific relationship — in this case, British history. The groupings of actions correspond to the period of rule of various monarchs. In any case, the groupings and the actions within each grouping are arranged chronologically with the earliest on top. Thus each of the groupings 90a, b, c, etc., are related to each other by the fact that they constitute a chronological summary of the historical development of a nation. The groupings 90a, b, c, are arranged on a vertical display panel so that one can easily scan downward through the chart and for example be presented with a summary of the important events in a country's history.

The vertical display panel 88 includes a marginal scale 92 along the vertical length thereof which, in this instance, divides the time period covered by the particular panel into annual increments. Each of the groupings 90a, 90b, 90c, etc., are separated from each other by suitable brackets 93a, 93b, 93c, etc., which encompass the actions associated with a particular period of rule. The brackets include horizontal portions 94a, 94b, 94c, etc., which separate the events of one period from those of the next. The horizontal portions are connected, one to the other, by vertical legs 96a, 96b, 96c, etc. These legs extend in length for a period of time corresponding to the period involved. The horizontal portions of the brackets extend from the vertical legs on the left, as shown, to the marginal scale on the right. Any two sequential horizontal portions intersect the marginal scale at the approximate year date which represents the beginning and end of a particular grouping of actions. Thus for example, grouping 90c which identifies actions during the reign of Harold Harefoot of Great Britain brackets the years 1030 A.D. to 1040 A.D.

As was the case with the previously described embodiments of the invention, FIGS. 1, 2, and 4, FIG. 5 represents a display panel which can be aligned with a similar display panel which has the same marginal scale as that shown in FIG. 5. By holding two such vertical display panels side by side, the user can quickly scan from one to the other and determine what events occurred within the same period in the two different areas represented by the respective display panels.

Because of the amount and nature of the material presented, i.e., along the vertical length of a display panel, it is often desirable to provide horizontal fold lines or to precrease the panels to enable the user to fold them into a compact unit easily carried in one's suit pocket or purse. These horizontal fold lines can be conveniently placed between groupings of information to allow selective viewing of the contents.

Further, panels concerning various aspects within a body of information can be placed on a suitable carrier, and the latter creased and foldable in accordion-like fashion to allow selective viewing within the content of that body.

Further, the vertical display panels can be equipped with a hook or ring, 134, in FIG. 5, which enables it to be hung, facilitating lengthy examination and exposure thereof, to individuals or a group, of the information thereon.

In addition to the visual analyses and comparisons which can be made of the panels, types 1, 2, and 3 particularly can be most expeditiously utilized with a suitable marking system. For example, felt or magnetic pads can be used to temporarily mark particular ones of the various characteristics selected by the user within each main chart. By so doing, the user is able to identify which object has the greatest number of favorable characteristics, thereby facilitating his final choice.

The invention is not to be construed as limited to the particular embodiments set forth. Rather the teaching of this invention, as defined by the appended claims should suggest numerous variations thereof, within its scope.

What is claimed:

1. An information display system for presenting information about objects, such as tourist attractions, having a common characteristic throughout, namely a location within a particular geographical area, said system comprising:

a plurality of separate and distinct, portable panels, said panels being disposable substantially in parallel columns and/or rows and orientated in the same upright position for ready viewing, each said panel including a carrier having the following information disposed thereon;
  a. a geographical chart consisting of a map of said geographical area, and means for dividing said map into a plurality of subsections, each of said subsections identified by a unique character positioned thereon,
  b. a marginal scale, said scale consisting of a predetermined order of said unique characters disposed upon said carrier at intervals along the edge of said carrier, said marginal scale identically disposed on each said carrier,
  c. a plurality of separate and physically independent, self-sufficient and self-contained, main charts, each of said main charts expressing an essential element of said information, said main charts disposed, one after the other, along the length of said carrier, each of said main charts containing at least one of the same forms of information, said forms of information positioned within said main chart identically from chart to chart, said forms of information limited in number to facilitate comparison of the content of each of said forms of information within each panel and between said panels, said information within each main chart related to a particular object located within said geographical area,
  d. means for referencing each said particular object described in each said main chart to the location along said marginal scale representing the geographical location of said particular object, said referencing means identical in form for each said main chart,
said identical position and same forms of information in each main chart, said identical marginal scales along the edge of said panel and said identical means for referencing each said particular object to the marginal scale combining to facilitate the comparison of the different objects described in each of the main charts both within and between panels.

2. An information display system for presenting information directed to achieving a given objective, such as recommended operations to a growth cycle of a rose, having a common characteristic throughout, namely, a recommended operation during a particular time interval, said system comprising:

a plurality of separate and distinct, portable panels, said panels being disposable substantially in parallel rows and/or columns and orientated in the same upright position for ready viewing, each said panel including a carrier having the following information disposed thereon;
  a. a marginal scale, said scale consisting of suitable indicia representing said time interval, disposed upon said carrier at intervals along the edge of said carrier, said marginal scale identically disposed on each said carrier,
  b. a plurality of separate and physically independent, self-sufficient and self-contained, main charts, each of said main charts expressing an essential element of said information, said main charts disposed, one after the other, along the length of said carrier, each of said main charts containing at least one of the same forms of information, said forms of information positioned within said main chart identically, from chart to chart, said forms of information limited in number to facilitate comparison of the content of each of said forms of information within each panel and between said panels, said information within each main chart related to an independent, elementary operation, directed to the achievement of said objective,
  c. means for referencing each said elementary operation described in each said main chart to the location along said marginal scale representing the point within said time interval when said elementary operation is to take place, said referencing means identical in form for each said main chart,
said identical position and same forms of information in each main chart, said identical marginal scales along the edge of said panel and said identical means for referencing each said elementary operation to the marginal scale combining to facilitate the comparison of the different operations described in each of the main charts both within and between panels.

3. An information display system for presenting information about a series of events, such as important social events in Great Britain, having a common characteristic throughout, namely, occurrence during a particular time interval, said system comprising:

a plurality of separate and distinct, portable panels, said panels being disposable substantially in parallel rows and/or columns and orientated in the same upright position for ready viewing, each said panel including a carrier having the following information disposed thereon;
  a. a marginal scale, said scale consisting of suitable indicia representing said time interval, disposed upon said carrier at intervals along the edge of said carrier, said marginal scale identically disposed on each said carrier,
  b. a plurality of separate and physically independent, self-sufficient and self-contained, main charts, each of said main charts expressing an essential element of said information, said main charts disposed, one after the other, along the length of said carrier, each of said main charts containing at least one of the same forms of information, said forms of information positioned within said main chart identically from chart to chart, said forms of information limited in number, to facilitate comparison of the content of each of said forms of information within each panel and between said panels, said information within each main chart related to the occurrence of a particular event within said time interval, c. means for referencing each said particular event described in each said main chart to the location along said marginal scale representing the point within said time interval when said particular event took place, said referencing means identical in form for each said main chart, said identical position and same forms of information in each main chart, said identical marginal scales along the edge of said panel and said identical means for referencing each said particular event to the marginal scale combining to facilitate the comparison of the particular events described in each of the main charts both within and between panels.

* * * * *

UNITED STATES PATENT AND TRADEMARK OFFICE
CERTIFICATE OF CORRECTION

PATENT NO. : 3,968,573
DATED : July 13, 1976
INVENTOR(S) : Jean-Paul Poliniere

It is certified that error appears in the above—identified patent and that said Letters Patent are hereby corrected as shown below:

Col. 4, line 38, delete "particularly" and substitute --particular--.

Col. 9, line 36, before the word "time" insert --represent--.

Signed and Sealed this

Fifth Day of October 1976

[SEAL]

Attest:

RUTH C. MASON
*Attesting Officer*

C. MARSHALL DANN
*Commissioner of Patents and Trademarks*